G. FISHBAUGH.
Chain-Pump.

No. 163,860.

Patented June 1, 1875.

Witnesses:
E. R. Hubbard
J. S. Byers

Inventor:
George Fishbaugh
Per A. H. Byers, his Atty

UNITED STATES PATENT OFFICE.

GEORGE FISHBAUGH, OF TIFFIN, OHIO.

IMPROVEMENT IN CHAIN-PUMPS.

Specification forming part of Letters Patent No. 163,860, dated June 1, 1875; application filed February 19, 1875.

*To all whom it may concern:*

Figure 1:
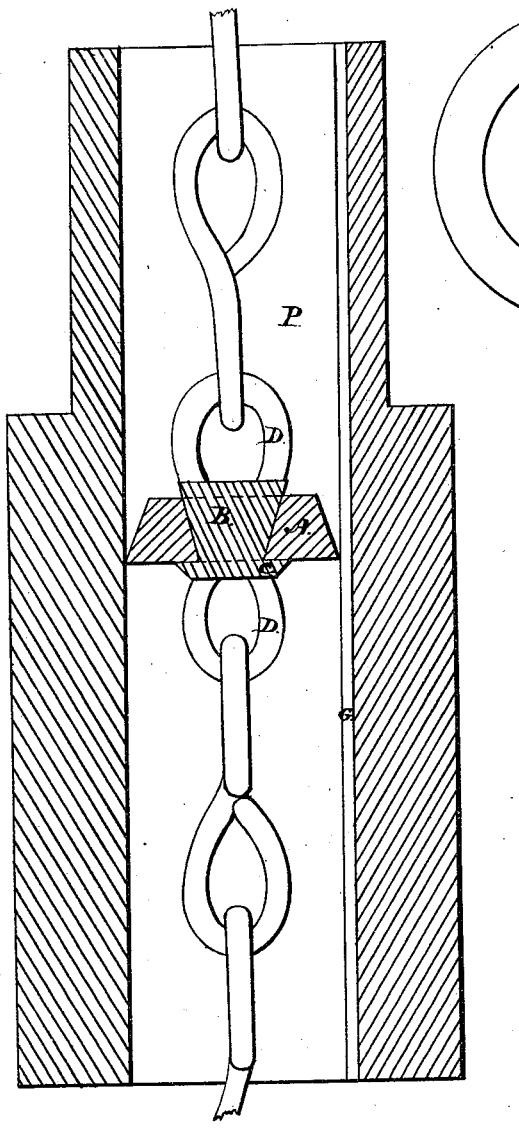
Figure 2:
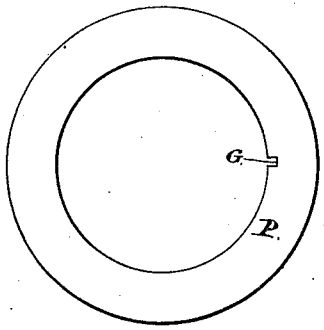

Be it known that I, GEORGE FISHBAUGH, of Tiffin, State of Ohio, have invented an Improvement in Chain-Pumps, of which the following is a specification:

In the accompanying drawing, Figure 1 represents a sectional drawing of my invention. P indicates the pump stock or tube, and is the same used in ordinary chain-pumps, with the exception that I cut a groove, G, in the inside, which allows the water to run off when the pump is not in use, and is made the entire length of the pipe or pump stock. (Shown also in Fig. 2.) A represents a bevel-edged rubber collar, the lower edge of which fits into the bore of the pump stock or tube. This collar is drawn up through the bore of the pump stock or tube by means of the flange C, which is firmly attached to the cone-shaped cylinder B, this cylinder passing through the center of the rubber collar A, and is provided with links D D at the top and bottom, to which any number of links can be attached to allow one or more flanges and collars to be in the pump stock or pipe at the same time. The cylinder and flange may be made of block-tin, or any other suitable materials.

Figure 3:
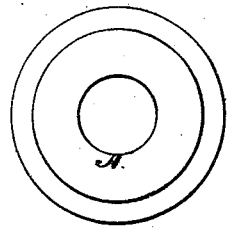

Fig. 3 is an end view of the rubber collar, the hole in the center of which is made so as to fit tightly the cone-shaped cylinder B, Fig. 1, over which it is to draw.

I claim as my invention—

1. A chain-pump stock provided with a groove, G, as and for the purposes set forth.

2. The combination of the chain-pump stock, provided with a groove, G, the cone-shaped cylinder B, with the flange C, the bevel-edged rubber collar A, and links D D, substantially as and for the purposes above described.

GEORGE FISHBAUGH.

Witnesses:
J. S. BYERS,
W. E. GREEN.